United States Patent
Tang et al.

(10) Patent No.: US 9,957,645 B2
(45) Date of Patent: May 1, 2018

(54) METHOD FOR PRODUCING CARBON FIBERS FROM POLYACRYLONITRILE (PAN) POLYMERS WITH LOW POLYDISPERSITY INDEX (PDI)

(71) Applicant: Cytec Industries Inc., Woodland Park, NJ (US)

(72) Inventors: Longgui Tang, Greenville, SC (US); Alan D. Thomas, Mauldin, SC (US); Billy D. Harmon, Simpsonville, SC (US)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 564 days.

(21) Appl. No.: 14/549,764

(22) Filed: Nov. 21, 2014

(65) Prior Publication Data
US 2015/0174807 A1     Jun. 25, 2015

Related U.S. Application Data

(60) Provisional application No. 61/919,843, filed on Dec. 23, 2013.

(51) Int. Cl.
*D01F 9/22* (2006.01)
*B29C 47/00* (2006.01)
(Continued)

(52) U.S. Cl.
CPC ............ *D01F 9/22* (2013.01); *B29C 47/0004* (2013.01); *C08F 2/06* (2013.01); *C08F 2/38* (2013.01); *C08F 6/003* (2013.01); *C08F 120/44* (2013.01); *C08F 220/44* (2013.01); *C08L 33/20* (2013.01); *B29D 99/0078* (2013.01); *B29K 2055/00* (2013.01); *B29L 2031/731* (2013.01); *C08F 2438/03* (2013.01); *D01D 5/06* (2013.01)

(58) Field of Classification Search
None
See application file for complete search history.

(56) References Cited

U.S. PATENT DOCUMENTS

2010/0003515 A1   1/2010   Tanaka et al.
2011/0038733 A1   2/2011   Hofmann et al.
(Continued)

FOREIGN PATENT DOCUMENTS

CN         103288994 A    9/2013

OTHER PUBLICATIONS

Liu, Xiao-hui, et al. "Well-defined higher-molecular-weight polyacrylonitrile via RAFT technique in the presence of disulfide compounds as a source of chain transfer agent." European Polymer Journal 44.4 (Jan. 26, 2008): 1200-1208. (Year: 2008).*

(Continued)

*Primary Examiner* — Benjamin A Schiffman
(74) *Attorney, Agent, or Firm* — Thi Dang

(57) ABSTRACT

A method for synthesizing polyacrylonitrile (PAN) polymer with a narrow molecular weight distribution is disclosed. The preferred PAN polymer has a PDI (Mw/Mn) of about 2 or less. Such PAN polymer is synthesized by controlled/living radical polymerization using a special RAFT (Reversible Addition-Fragmentation Chain Transfer) agent. Also disclosed is a method for producing carbon fibers from PAN polymer with low PDI.

12 Claims, 2 Drawing Sheets

(51) Int. Cl.
  *C08F 120/44*  (2006.01)
  *C08F 2/06*  (2006.01)
  *C08F 2/38*  (2006.01)
  *C08F 220/44*  (2006.01)
  *C08F 6/00*  (2006.01)
  *C08L 33/20*  (2006.01)
  *B29D 99/00*  (2010.01)
  *B29K 55/00*  (2006.01)
  *B29L 31/00*  (2006.01)
  *D01D 5/06*  (2006.01)

(56) References Cited

U.S. PATENT DOCUMENTS

2013/0136914 A1   5/2013   Choi et al.
2013/0253096 A1   9/2013   Kibayashi et al.

OTHER PUBLICATIONS

Niu, Shaogan et al; "Synthesis of High Molecular Weight and Narrow Molecular Weight Distribution Poly (acrylonitrile) via RAFT polymerization", Journal of Polymer Science, Part A: Polymer Chemistry, vol. 51, 1197-1204 (2013).

Liu, Xiao-Hui et al; "2-Cyanoprop-2-yl Dithiobenzoate Mediated Reversible Addition—Fragmentation Chain Transfer Polymerization of Acrylonitrile Targeting a Polymer with a Higher Molecular Weight", Journal of Polymer Science: Part A: Polymer Chemistry, vol. 45, 1272-1282 (2007), Changchun, China.

Tang, Chuanbing et al; "RAFT Polymerization of Acrylonitrile and Preparation of Block Copolymers Using 2-Cyanoethyl Dithiobenzoate as the Transfer Agent", Macromolecules, vol. 36, 8587-9589 (2003), Pennsylvania, U.S.

Xia-Hui Liu et al.: "Well-defined higher-molecular-weight polyacrylonitrile via RAFT technique in the presence of disulfide compounds as a source of chain transfer agent", European Polymer Journal, vol. 44, Jan. 26, 2008 (Jan. 26, 2008), pp. 1200-1208.

C. Giovedi et al.: "Evaluation of the mechanical properties of carbon fiber after electron beam irradiation", Nuclear Instruments & Methods in Physics Research, Section - B:Beam Interactions With Materials and Atoms, Elsevier, Amsterdam, NL, Materials and Atoms, Elsevier, Amsterdam, NL, vol. 236, No. 1-4, Jul. 1, 2005 (Jul. 1, 2005), pp. 526-530.

J. Sporl et al.: "Carbon fibers prepared from tailored reversible-addition-fragmentation transfer copolymerization-derived poly(acrylonitrile)-co-poly(methylmethacrylate)", Journal of Polymer Science, Part A: Polymer Chemistry, vol. 52, Feb. 12, 2014 (Feb. 12, 2014), pp. 1322-1333.

* cited by examiner

US 9,957,645 B2

METHOD FOR PRODUCING CARBON FIBERS FROM POLYACRYLONITRILE (PAN) POLYMERS WITH LOW POLYDISPERSITY INDEX (PDI)

This application claims the benefit of prior U.S. Provisional Application No. 61/919,843 filed on Dec. 23, 2013, the disclosure of which is incorporated herein in its entirety.

TECHNICAL FIELD

The present disclosure generally relates to the synthesis of polyacrylonitrile (PAN) polymers and methods of forming carbon fibers from PAN polymers.

BACKGROUND

Because of the properties such as high specific strength and stiffness, high chemical resistance, and low thermal expansion, carbon fiber has been used widely in aerospace, sports, and commercial industries of automobile, wind energy, and other energy saving areas. Typically, carbon fibers are made from polyacrylonitrile (PAN)-based polymers.

Free Radical Polymerization

PAN polymers, traditionally, are made by free radical polymerization method. In free radical polymerization, a catalyst or an initiator initiates first to form initial free-radical species. These radical species start to react with monomers to create active centers to form free monomer-radicals. Then the monomer radicals react with other monomers to propagate the molecular chain to form polymer radicals.

During the polymerization, sometimes, one radical reacts with other radical to couple and form a long dead chain, as a combination termination, while some radical at the end of one chain may attack a hydrogen atom at the second-to-last carbon atom in the second radical chain to form a disproportionation termination. The polymer radical can also react with another compound, such as a chain transfer agent, to terminate the propagation reaction of the polymer radical, and to form a new radical from chain transfer agent. This newly formed chain transfer radical starts its new chain propagation. Thus, the chain transfer agent reduces the length of polymer radical chain grown. If the rate of this termination is much higher than the rate of propagation, then very small polymers with short chain lengths are formed. Therefore, the chain transfer agent is used to control the molecular length or weight of the polymer. Because of the different termination mechanisms, the resulting molecular chains have different lengths or different molecular weights. As such, the molecular weight of polymers has a distribution. This distribution can be defined by its polydispersity index (PDI), as follows:

$$PDI = \frac{Mw \text{ (Weight average molecular weight)}}{Mn \text{ (number average molecular weigh)}}$$

Alternatively, PDI may be expressed as follows:

$$PDI = \frac{Mz(Z - \text{average molecular weight})}{Mw(\text{weight average molecular weight})}$$

Mw, Mn, Mz are measured by a GPC (gel permeation chromatography) method. Here, Mw is the weight average molecular weight. Mn is the number average molecular weight and Mz is the Z-average molecular weight or the size average molecular weight.

A high PDI indicates that the polymer has a large molecular weight distribution, which means the polymer has very high molecular weight species or very low molecular weight species, or both. In other words, the polymer is composed of molecular chains that vary greatly in lengths. The presence of too high molecular weight or too small molecular weight species will affect the process-ability of the polymer into fibers by spinning and the resulting fiber properties, especially the too small molecular weight species, due to the fact that the small molecular weight species are a kind of molecular defect to polymer mechanical properties.

PAN polymer prepared by conventional radical polymerization does not allow control over polymerization. The resulting polymer has large molecular weight distribution. Thus, there is a difficulty for the mechanical property development of the fibers spun from such PAN.

SUMMARY

The present disclosure provides a method for synthesizing polyacrylonitrile (PAN) polymer with a narrow molecular weight distribution, and a method for producing carbon fiber precursors from such polymer. The preferred PAN polymer has a PDI (Mw/Mn) of about 2 or less. Such PAN polymer is synthesized by controlled/living radical polymerization using a special RAFT (Reversible Addition-Fragmentation Chain Transfer) agent.

Carbon fibers produced from the fiber precursors exhibit good properties such as uniform cross-section, low micro and molecular defects. Such good properties are due to the fact that the low-PDI polymer has a uniform Mw, and results in low molecular and micro-defects during carbon fiber manufacturing processes.

DETAILED DESCRIPTION

Figure 1:
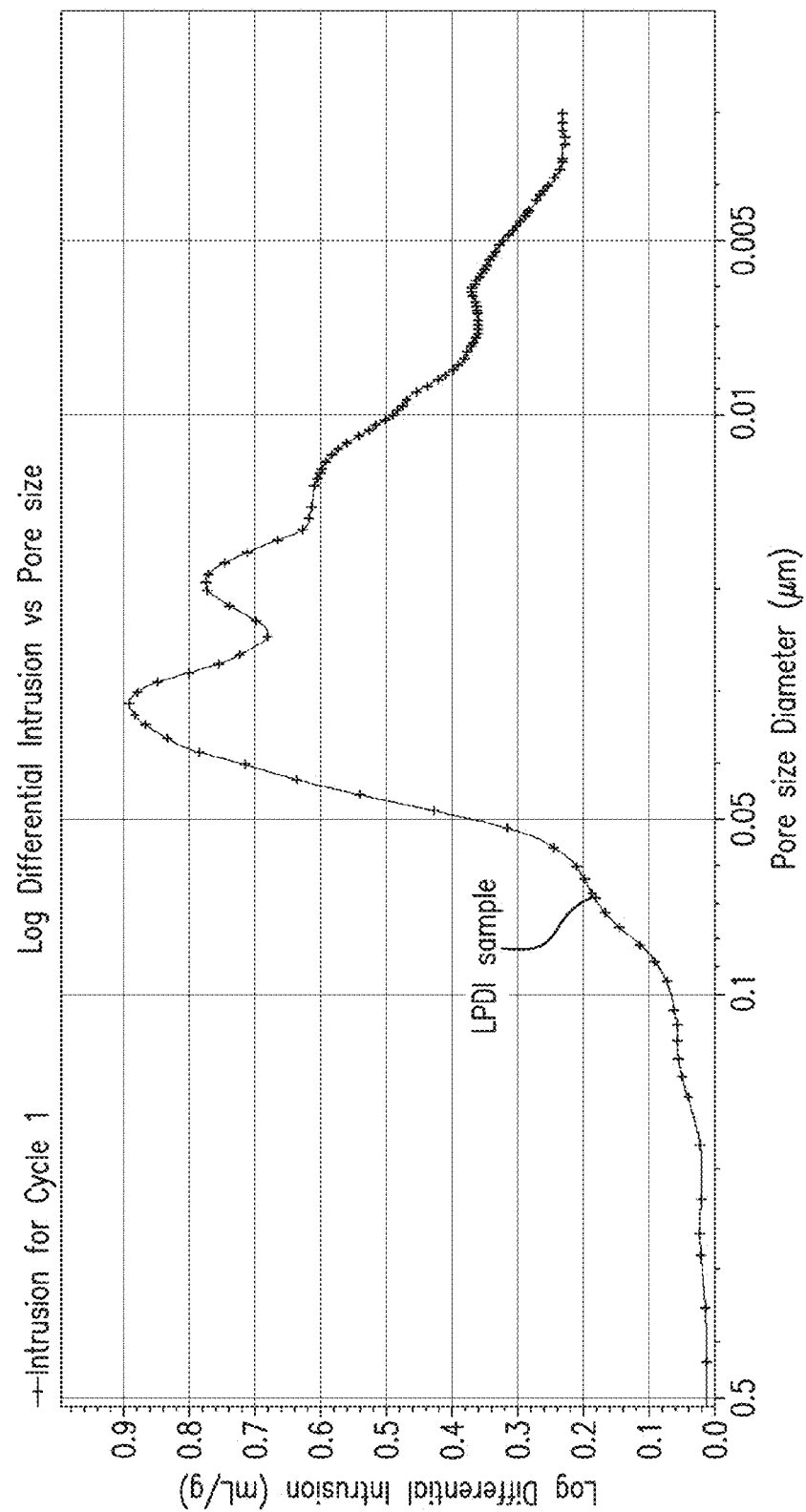
FIG. 1 is a Mercury porosimetry graph showing the micro-pore distribution of a freeze-dried PAN coagulated fiber produced from a low-PDI PAN polymer.

One aspect of the present disclosure is related to a mechanism for controlling the PAN molecular weight distribution or PDI by controlled/living radical polymerization using special RAFT agents. The PDI (Mw/Mn) is targeted to around 2 or less, preferably PDI (Mw/Mn) of 1.2 to 1.9 (or an alternative PDI (Mz/Mw) of 1.2 to 1.7).

Controlled/Living Radical Polymerization

If the chain termination occurs only after all the monomers are consumed during radical polymerization, this polymerization is called a living polymerization. In this polymerization reaction, the propagation can continue if more monomer is added to the reaction. As an ideal living polymerization, all chains are initiated at the beginning of the reaction and grow at a similar rate. There is no irreversible chain transfer or termination. If initiation is rapid with respect to propagation, the molecular weight distribution is very narrow and the chains can be extended by further adding monomers into the reaction. However, in a radical polymerization all chains cannot be simultaneously active. Therefore, some reagent is used to control the propagation and its rate by forming a dormant stage. By reversibly de-activating or activating the propagation, a rapid equilibrium between the active and dormant chains can be achieved to control the chain growth at a similar rate such that the narrow molecular weight distribution can be obtained. This is called "controlled/living radical polymerization". The chemical used herein is called RAFT (Reversible Addition/Fragmentation Chain Transfer) agent.

Synthesis of PAN Polymer

The method for making PAN polymers having a narrow molecular weight distribution is a solution polymerization method that includes:
  a. combining acrylonitrile (AN) monomer with a solvent, one or more co-monomers, and a RAFT agent (as defined herein) to form a solution;
  b. heating the solution to a temperature above room temperature, i.e. >25° C., for example, 40° C.-85° C.; and
  c. adding an initiator to the solution to initiate a polymerization reaction.

After polymerization is completed, unreacted AN monomers are stripped off, e.g. de-aeration under high vacuum, and the resulting PAN polymer solution is cooled down. At this stage, the PAN polymer is in a solution or a dope form ready for spinning.

The polymerization of AN monomers is affected by controlled/living radical polymerization using a RAFT agent which is a thiocarbonylthio compound having the following structure:

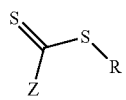

The effectiveness of the RAFT agent is dependent on the substituents R and Z. The substituents impact the polymerization reaction kinetics and the degree of structural control. R group is a free radical leaving group. It controls the re-initiation polymerization during RAFT polymerization. And the Z group controls the stability of C=S bond reactivity and influences the rate of radical addition and fragmentation.

The preferred RAFT agents are selected from the group consisting of thiocarbonylthio compounds having the following structures:

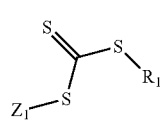 (I)

where $Z_1$=—$CH_2$—$(CH_2)_{10}$—$CH_3$; —$(CH_2)_n$—$CH_3$, n=0-20;
—$C(CH_3)_m$—COOH, m=1-2; —$C(CH_3)_m$—$COOCH_3$, m=1-2;
—$C(CH_3)_m$—$COOC_2H_5$, m=1-2,

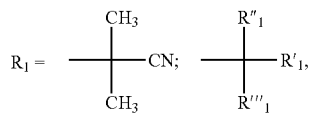

$R'_1$=—CN;

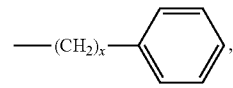

x=0-1;
$R''_1$=H; —$CH_3$; —$(CH_2)_m$—COOH, m=1-2;
$R'''_1$=H; —$CH_3$

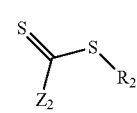 (II)

where

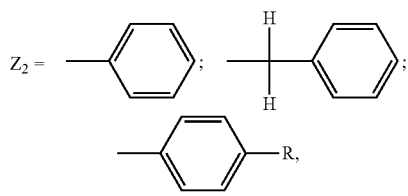

R=F, Cl, CN, $OCH_3$;

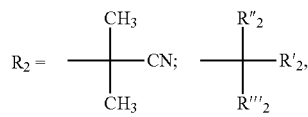

$R'_2$=—CN;

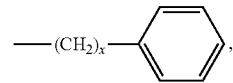

X=0-1;
—$C(CH_3)_m$—$COOCH_3$, m=1-2;
—$C(CH_3)_m$—$COOC_2H_5$, m=1-2;
$R''_2$=H; —$CH_3$; —$(CH_2)_m$—COOH, m=1-2;
$R'''_2$=H; —$CH_3$

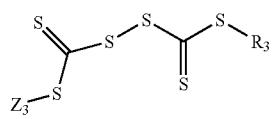 (III)

where $Z_3$=—$CH_2$—$(CH_2)_{10}$—$CH_3$; —$(CH_2)_y$—$CH_3$, y=1-20;
$R_3$=—$CH_2$—$(CH_2)_{10}$—$CH_3$; —$(CH_2)_y$—$CFH_3$, y=1-20.

Specific examples of RAFT agents having structures I, II, and III above are, respectively:

1) Trithiocarbonate: 2-cyano-2-propyl dodecyl trithiocarbonate (CPDTC)

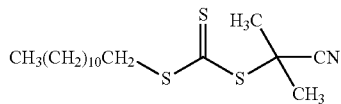

2) Dithiobenzoate: 2-cyano-2-propyl benzodithioate (CPBZ)

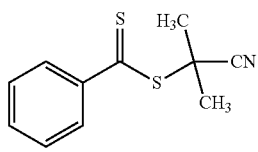

3) Thiocarbonyl disulfide: bis-dodecylsufanylthiocarbonyl disulfide (BDSTD)

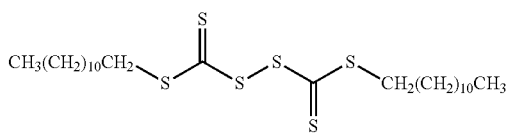

Suitable solvents for polymerization include: dimethyl sulfoxide (DMSO), dimethyl formamide (DMF), dimethyl acetamide (DMAc), ethylene carbonate (EC), Zinc Chloride ($ZnCl_2$)/water, and Sodium thiocyanate (NaSCN)/water.

Co-monomers that are suitable for the synthesis of the PAN polymers may be one or more vinyl-based acids, including: methacrylic acid (MAA), acrylic acid (AA), itaconic acid (ITA), vinyl-based esters, for example, methacrylate (MA), methyl methacrylate (MMA), vinyl acetate (VA), ethyl acrylate (EA), butyl acrylate (BA), ethyl methacrylate (EMA), and other vinyl derivatives, for example, vinyl imidazole (VIM), acrylamide (AAm), and diacetone acrylamide (DAAm).

The PAN polymerization can be initiated by an initiator (or catalyst) of azo-based compound, for example: azo-bisisobutyronitrile (AIBN), azobiscyanovaleric acid (ACVA), and 2,2'-azobis-(2,4-dimethyl) valeronitrile (ABVN), or others, or an organic peroxide, for example, dilauroyl peroxide (LPO), ditert-butyl peroxide (TBPO), diisopropyl peroxydicarbonate (IPP), and others.

According to a preferred embodiment, PAN polymerization is carried out based on the following formulation, % by weight (wt %): >90% AN monomer; <5% co-monomer; <1% initiator; <1% RAFT agent, based on total weight of these four components; and sufficient amount of solvent to form a solution for containing 5 wt % to 28 wt % of final PAN polymer, preferably, 15 wt % to 25 wt %.

The controlled/living radical polymerization method enables control over the polymer architecture. This includes molecular weight, molecular weight distribution (i.e. polydispersity), functionality, and composition. The RAFT agents discussed above function as chain transfer agents during the controlled/living radical polymerization of AN monomers into PAN.

The RAFT polymerization mechanism has four reaction steps: initiation, addition-fragmentation, re-initiation and equilibration, as illustrated below using, as an example, CPDTC as the RAFT agent. During PAN polymerization, azo-bisisobutyronitrile (AIBN) is used as an initiator and DMSO as solvent.

A. Initiation by AIBN (Azobisisobutyronitrile)

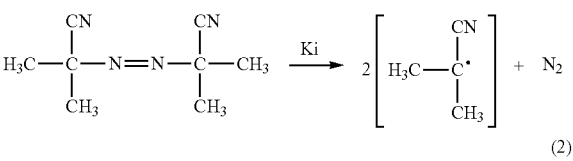
(1)

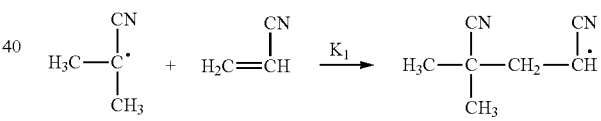
(2)

B. Addition-Fragmentation with CPDTC

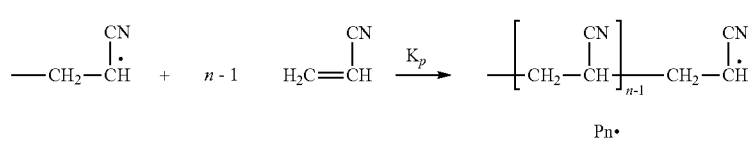
(3)

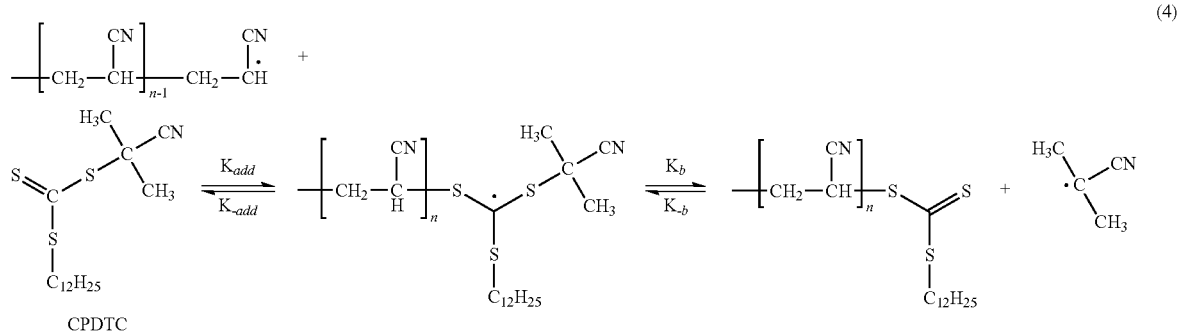
(4)

C. Re-Initiation

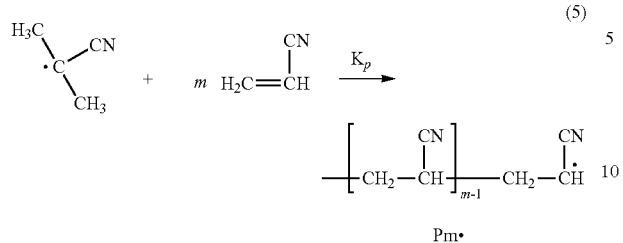
(5)

D. Equilibration

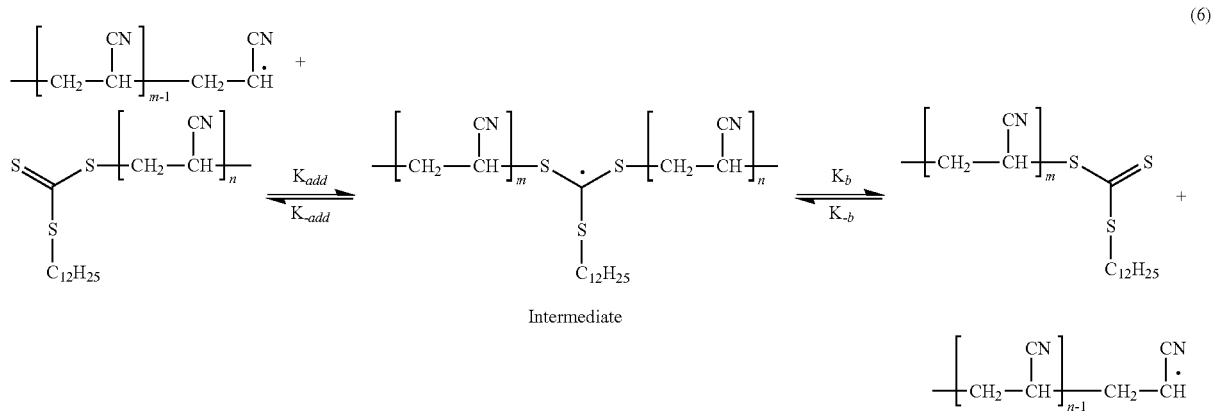
(6)

The polymerization is initiated by AIBN. It decomposes to form two free radicals (Equation 1) and then the radicals start to react with AN monomer to initiate the polymerization (Equation 2). More (AN) reacts with radicals and forms living polymer or polymeric radical Pn* (Equation 3). CPDTC, as a RAFT agent, reacts or adds to Pn* to form a RAFT adduct radical. This RAFT adduct radical can lead a fragmentation reaction in either direction to get the starting species or a new radical and polymeric RAFT-Pn (Equation 4). This is a reversible step. In reaction Equation 5, the newly formed radical re-initiates the polymer growth to get another living polymer or polymeric radical Pm*. This living polymer Pm* reacts with the polymeric RAFT-Pn to form a RAFT adduct radical intermediate (Equation 6). This intermediate can fragment in either direction to control the chains having equal opportunities for Pn* or Pm* growth and a narrow PDI. The polymerization will end when all the monomers and co-monomers are consumed.

The molecular weight of the PAN polymers produced by the method described above may be within the range of 60 to 500 kg/mole, preferably 90 to 250 kg/mole, and mostly preferably, 115 to 180 kg/mole, with PDI of about 2 or less. The molecular weight is measured by a Viscotek GPCmax gel permeation chromatography (GPC) system. During the characterization, DMF (dimethyl formamide) with 0.02M LiBr is used as mobile phase with 1 ml/min flow rate. And the column temperature is set at 45° C.

Carbon Fiber Fabrication

The above-described low-PDI PAN polymers are suitable for wet spinning and air-gap spinning (or alternately "dry-jet wet spinning") to make continuous carbon fiber precursors (i.e. white fibers). It has been found that the low-PDI PAN polymers have good spinning ability; i.e., the ease of making fibers from such polymers by spinning process. The resulting fiber precursors produced from such polymers show cross-section uniformity, tenacity >5 g/denier, and initial modulus >125 g/denier, per ASTM 2256.

To make PAN white fibers, the PAN polymer solution (i.e. spin "dope") is subjected to conventional wet spinning and/or air-gap spinning after removing air bubbles by vacuum. The spin "dope" may have a polymer concentration within the range of 5%-28% by weight, preferably, 15 wt % to 25 wt %, based on the total weight of the solution. In wet spinning, the dope is filtered and extruded through holes of a spinneret (made of metal) into a liquid coagulation bath for the polymer to form filaments. The spinneret holes determine the desired filament count of the PAN fiber (e.g., 3,000 holes for 3K carbon fiber). In air-gap spinning, a vertical air gap of 1 to 50 mm, preferably 2 to 15 mm, is provided between the spinneret and the coagulating bath. In this spinning method, the polymer solution is filtered and extruded in the air from the spinneret and then extruded filaments are coagulated in a coagulating bath. A coagulation liquid used in the process is a mixture of a solvent and a non-solvent. Water or alcohol is typically used as the non-solvent. The ratio of solvent and non-solvent and bath temperature are used to adjust the solidification rate of the extruded nascent filaments in coagulation.

The spun filaments are then withdrawn from the coagulation bath by rollers through a wash bath to remove excess coagulant and stretched in hot (e.g. 40° C. to 100° C.) water baths to impart molecular orientation to the filaments, as the first step of controlling the fiber diameter. The stretched filaments are then dried, for example, on drying rolls. The drying rolls may be composed of a plurality of rotatable rolls arranged in series and in serpentine configuration, over which the filaments pass sequentially from roll to roll and under sufficient tension to provide filaments stretch or relaxation on the rolls. At least some of the rolls are heated by means of pressurized steam which is circulated internally or through the rolls, or electrical heating elementals inside of the rolls. A finishing oil may be applied to the stretched fibers, prior to drying, in order to prevent the filaments from sticking to each other in downstream processes.

As the second step of controlling the fiber diameter, a superstretch follows the first fiber draw. This superstretch process is performed at a temperature of 100° C. to 185° C., above the glass transition temperature of fiber, preferably at 135° C. to 175° C. Such stretch further orientates the molecules to filaments. The superstretched fiber may have a diameter of about 0.4 to 1.5 denier, preferably 0.5-1.0 denier.

The processing conditions (including the composition of the spin solution and coagulation bath, the amount of total stretches, temperatures, and filament speeds) are correlated to provide filaments of a desired structure and denier. Following the superstretch step, the fiber filaments may pass over one or more hot rolls and then wound onto bobbins.

To convert the PAN white fibers into carbon fibers, the PAN fibers are subjected to oxidation and carbonization.

During the oxidation stage, the PAN fibers are fed under tension through one or more specialized ovens, into which heated air is fed. The oxidation oven temperature may range from 200° C. to 300° C., preferably 220 to 285° C. The oxidation process combines oxygen molecules from the air with the PAN fiber and causes the polymer chains to start crosslinking, thereby increasing the fiber density to 1.3 g/cm$^3$ to 1.4 g/cm$^3$. In the oxidization process, the tension applied to fiber is generally to control the fiber drawn or shrunk at a stretch ratio of 0.8 to 1.35, preferably 1.0 to 1.2. When the stretch ratio is 1, there is no stretch. And when the stretch ratio is greater than 1, the applied tension causes the fiber to be stretched. Such oxidized PAN fiber has an infusible ladder aromatic molecular structure and it is ready for carbonization treatment.

Carbonization occurs in an inert (oxygen-free) atmosphere inside one or more specially designed furnaces. In a preferred embodiment, the oxidized fiber is passed through a pre-carbonization furnace that subjects the fiber to a heating temperature of from about 300° C. to 900° C., preferably 350 to 750° C., while being exposed to an inert gas, e.g. nitrogen, followed by carbonization by passing the fiber through a furnace heated to a higher temperature of from about 700° C. to 1650° C., preferably 800 to 1450° C., while being exposed to an inert gas. Fiber tensioning should be added throughout the precarbonization and carbonization processes. In pre-carbonization, the applied fiber tension is sufficient to control the stretch ratio to be within the range of 0.9 to 1.2, preferably 1.0 to 1.15. In the carbonization, the tension used is sufficient to provide a stretch ratio of 0.9 to 1.05. Carbonization results in the crystallization of carbon molecules and consequently produces a finished carbon fiber that has more than 90 percent carbon content.

Adhesion between the matrix resin and carbon fiber is an important criterion in a carbon fiber-reinforced polymer composite. As such, during the manufacture of carbon fiber, surface treatment may be performed after oxidation and carbonization to enhance this adhesion.

Surface treatment may include pulling the carbonized fiber through an electrolytic bath containing an electrolyte, such as ammonium bicarbonate or sodium hypochlorite. The chemicals of the electrolytic bath etch or roughen the surface of the fiber, thereby increasing the surface area available for interfacial fiber/matrix bonding and adding reactive chemical groups.

Next, the carbon fiber may be subjected to sizing, where a size coating, e.g. epoxy-based coating, is applied onto the fiber. Sizing may be carried out by passing the fiber through a size bath containing a liquid coating material. Sizing protects the carbon fiber during handling and processing into intermediate forms, such as dry fabric and prepreg. Sizing also holds filaments together in individual tows to reduce fuzz, improve processability and increase interfacial shear strength between the fiber and the matrix resin.

Following sizing, the coated carbon fiber is dried and then wound onto a bobbin.

Carbon fibers produced from the above-described low-PDI PAN polymers have been found to have the following mechanical properties: tensile strength of greater than 700 Ksi (4826 MPa) and tensile initial modulus of greater than 35 Msi (241 GPa), per ASTM D4018 test method.

The benefits and properties of the above-described PAN polymer and carbon fibers produced therefrom will be further illustrated by the following Examples.

EXAMPLES

Example 1

Synthesis of PAN Polymers

PAN polymers were prepared according to the formulations for PAN polymerization shown in Tables 1A-1C.

TABLE 1A

Formulations for PAN polymerization

| Components | Formulation 1 | Formulation 2 | Formulation 3 | Formulation 4 |
|---|---|---|---|---|
| Acrylonitrile (AN) | 99.30 | 99.30 | 99.30 | 99.30 |
| Itaconic acid (ITA) | 0.70 | 0.70 | 0.70 | 0.70 |
| CPBZ | | 0.113% | | 0.029% |
| BDSTD | 0.359%* | | 0.045% | |

TABLE 1B

Formulations for PAN polymerization

| Components | Formulation 5 | Formulation 6 | Formulation 7 | Formulation 8 |
|---|---|---|---|---|
| Acrylonitrile (AN) | 99.30 | 99.30 | 99.00 | 98.00 |
| Itaconic acid (ITA) | 0.70 | 0.70 | 1.00 | |
| Methacrylic acid (MAA) | | | | 2.00 |
| CPDTC | 0.019% | 0.009% | 0.022% | 0.033% |

TABLE 1C

Formulations for PAN polymerization

| Components | Formulation 9 | Formulation 10 | Formulation 11 | Formulation 12 |
|---|---|---|---|---|
| Acrylonitrile (AN) | 96.00 | 96.00 | 97.00 | 99.00 |
| Itaconic acid (ITA) | | | 1.00 | 1.00 |
| Methacrylic acid (MAA) | 2.00 | 2.00 | | |
| Methacrylate (MA) | | | 2.00 | 2.00 |
| Vinyl imidazole (VIM) | 2.00 | | | |
| CPDTC | 0.030% | 0.030% | 0.025% | 0.022% |

In the above Tables, CPDTC, CPBZ, BDSTD are RAFT agents, where:
CPDTC=2-cyano-2-propyl dodecyl trithiocarbonate
CPBZ=2-cyano-2-propyl benzodithioate
BDSTD=bis-dodecylsufanylthiocarbonyl disulfide
Note: * Raft agent is used by mole % based on the total amount of monomers.

Controlled/living radical PAN polymerization was performed as follows:

Azo-bisisobutyronitrile (AIBN) was used as an initiator/catalyst and DMSO as solvent. The RAFT agents were used as chain transfer agents. During polymerization, the following sequence of steps was carried out:
  a) Metering DMSO from DMSO storage tank to a reactor, then AN from AN storage tank to the reactor;
  b) Purging the reactor with nitrogen;
  c) Preheating the reactor and adding co-monomers and RAFT agent into reactor at above room temperature (25° C.);
  d) Heating up the reactor and then adding the initiator/catalyst at the desired temperature point of 40-85° C.;
  e) Starting the polymerization for the time of 15-23 hours at the temperature of 60-80° C.;
  f) Cooling down to a low temperature (40-50° C.) and discharging the polymer solution.

Following polymerization, the molecular weights and PDI of the produced PAN polymers were measured and the results are shown in Tables 2A-2C.

Gel Permeation Chromatography (GPC) was used to analyze the resultant PAN polymers for their molecular weights and polydispersity index (PDI). Viscotek GPCmax/SEC Chromatography System with low angle and right angle light scattering detectors and RI detector was used. Data were collected and analyzed using Viscotek OMNISEC Version 4.06 software for the absolute weight-average molecular weight (Mw) and its distribution determination.

TABLE 2A

Polymer molecular weights and distribution

|  | Formulation-1 | Formulation-2 | Formulation-3 | Formulation-4 |
|---|---|---|---|---|
| Mn (g/mole) | 37101 | 40617 | 56777 | 48177 |
| Mw (g/mole) | 59179 | 63362 | 101143 | 82538 |
| Mw/Mn | 1.595 | 1.560 | 1.781 | 1.713 |
| Mz | 81747 | 82742 | 148522 | 120826 |
| Mz/Mw | 1.381 | 1.306 | 1.468 | 1.464 |

TABLE 2B

Polymer molecular weights and distribution

|  | Formulation 5 | Formulation 6 | Formulation 7 | Formulation 8 |
|---|---|---|---|---|
| Mn (g/mole) | 78945 | 128773 | 86125 | 64265 |
| Mw (g/mole) | 155568 | 217778 | 159746 | 113551 |
| Mw/Mn | 1.971 | 1.691 | 1.855 | 1.767 |
| Mz | 236895 | 327687 | 226813 | 167536 |
| Mz/Mw | 1.523 | 1.505 | 1.420 | 1.475 |

TABLE 2C

Polymer molecular weights and distribution

|  | Formulation 9 | Formulation 10 | Formulation 11 | Formulation 12 |
|---|---|---|---|---|
| Mn (g/mole) | 72193 | 66710 | 69560 | 76579 |
| Mw (g/mole) | 147459 | 121290 | 137019 | 150027 |
| Mw/Mn | 2.043 | 1.818 | 1.970 | 1.959 |
| Mz | 237764 | 173392 | 195056 | 224951 |
| Mz/Mw | 1.612 | 1.430 | 1.424 | 1.499 |

All PAN polymers produced from Formulations with RAFT agents yielded PAN polymers with PDI (Mw/Mn) of around 2 or less. PAN polymer produced from Formulation 6 has a higher molecular weight (Mw) of 217778 g/mole with 1.69 PDI after adjusting the dose of RAFT agent and solution concentration with respect to Formulation 5.

Example 2

Fabrication of White Fibers

PAN polymer produced from Formulation 5, as described in Example 1, was used to form carbon fiber precursors (or white fibers) by wet spinning. PAN polymers produced from Formulation 12, as described in Example 1, was used to form white fibers by air-gap spinning method with 150 µm spinneret.

Properties of the white fibers were determined as follows.
Cross-Section Analysis White fiber bundle sample was submerged into acrylic resin and then cured. The cured fiber resin rod is polished on a grounder with different grade sander paper for smooth cross-section. After that, the fiber cross-section is measured under an optical microscopy with image-analysis system for cross section uniformity.

Porosimetry

For air-gap spinning, fiber sample exiting coagulation bath was freeze-dried at −60° C. and the freeze-dried sample was tested by a mercury porosimeter for porosity and porous structure analysis.

Tenacity & Modulus

Fiber tenacity and initial modulus were measured per ASTM D2256 method.

TABLE 3

White fiber properties & spinning method

|  | Formulation | |
|---|---|---|
|  | Formulation 5 | Formulation 12 |
| Dope concentration % | 18.8 | 22.14 |
| Spinning method | Wet spinning | Air-gap |
| Spinneret size | 3K | 3K |
| Freeze-dried coagulated fiber porosity/% | — | 85.75 |
| Total draw ratio/time | 12.2 | 10.67 |
| White fiber tenacity g/d | 7.00 | 6.54 |
| White fiber modulus g/d | 144.3 | 161 |

The PAN polymers based on Formulations 5 and 12 were found to have good spinning ability. The resultant white fiber precursors from both wet and airgap spinnings also had good tenacity and modulus as can be seen from Table 3.

Figure 2:
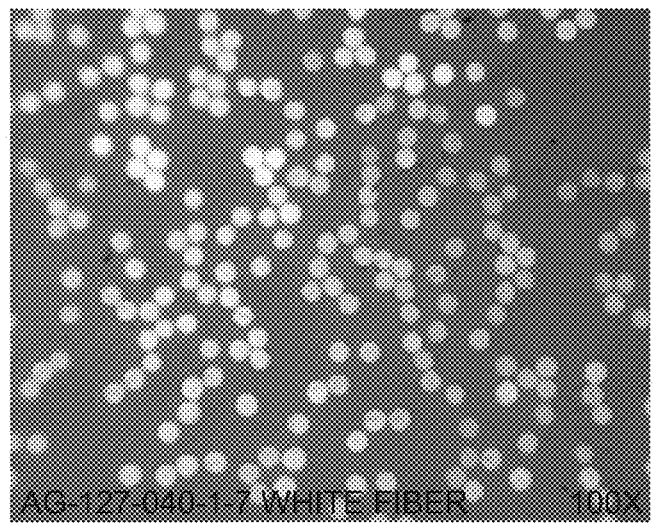
FIG. 2 is a micrograph image of the cross section area of a PAN fiber precursor produced from a low-PDI PAN polymer.
Figure 3:
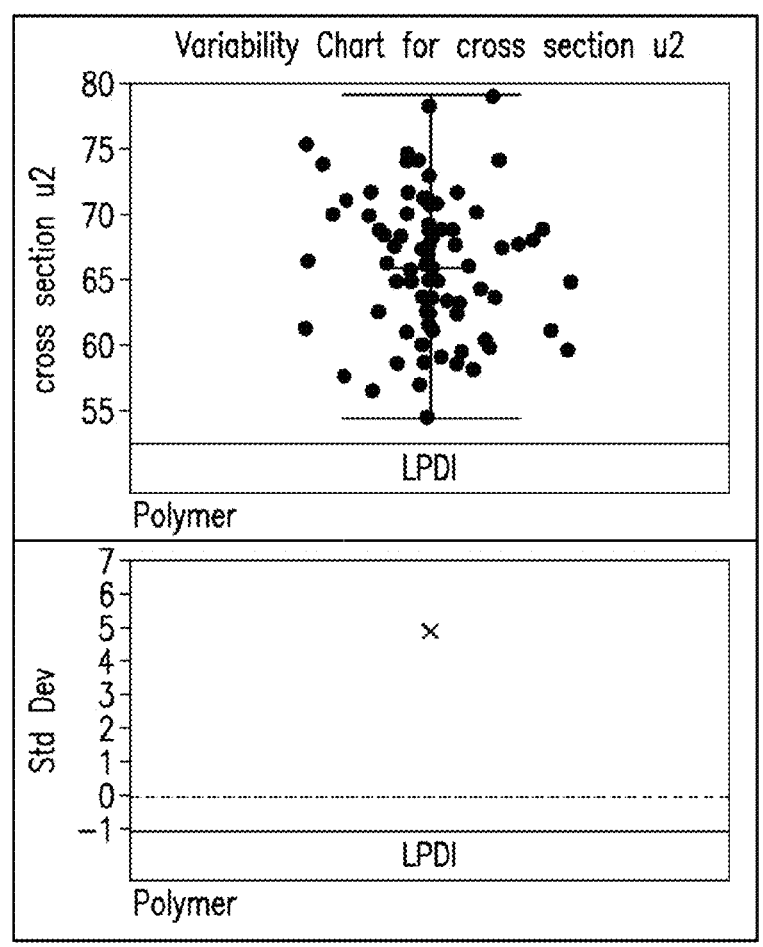
FIG. 3 is a variability chart for the cross section area of the same PAN fiber precursor referenced in FIG. 2.

FIG. 1 is a Mercury porosimetry graph for the distribution of pore diameters in the freeze-dried coagulated fiber. The Y-axis is in the log differential intrusion in ml/g or dV/dlog D. V is the volume of mercury intruded into the pores of the sample. X-axis is of pore diameter in logarithm. Thus, the figure shows the derivative of intruded volume with respect to the logarithm of pore diameter. The total volume or voids is the area under the curve. FIG. 1 shows that the freeze-dried PAN coagulated fiber produced by airgap spinning from low-PDI PAN polymer according to Formulation 12 has low micro-pore defects. The micrograph image of FIG. 2 and the variability chart of FIG. 3 show that the low-PDI white fiber spun by airgap spinning has a uniform cross section. FIG. 3 is the variability chart of the cross section area, showing the dispersion or spread.

Converting White Fibers into Carbon Fibers

The white fiber precursors were oxidized in air within the temperature range of 220° C.-285° C., and carbonized in nitrogen within the temperature range of 350° C.-650° C. (pre-carbonization) and then 800° C.-1300° C.

The tensile strength and tensile modulus of the resulting carbon fibers were determined and are shown in Table 4.

TABLE 4

Carbonization & carbon fiber properties

| | Formulation | |
|---|---|---|
| | Formulation 5 | Formulation 12 |
| Oxidization temperature (° C.) | 220-285 | 220-285 |
| Pre-carbonization temperature (° C.) | 350-650 | 350-650 |
| Carbonization temperature (° C.) | 800-1300 | 800-1300 |
| Fiber tensile strength (ksi) | 772 (5323 MPa) | 800 (5516 MPa) |
| Fiber tensile modulus (Msi) | 41.9 (289 GPa) | 43.0 (296 GPa) |
| Fiber density (g/cm³) | 1.809 | 1.822 |

Carbon fiber's tensile strength and initial modulus was determined per ASTM D4018. The carbon fiber was first impregnated into an epoxy resin bath and then cured. The cured carbon fiber strand is tested on MTS under 0.5 in/min crosshead speed for its tensile strength and modulus.

Fiber density was determined by liquid immersion method per ASTM D3800.

What is claimed is:

1. A method for producing a carbon fiber, comprising:

a) combining acrylonitrile (AN) monomer with a solvent, at least one co-monomer, and a thiocarbonylthio compound to form a solution;

b) heating the solution to a temperature within the range of 40° C.-85° C.; and c) adding an initiator to the heated solution to affect polymerization reaction, thereby forming a polymer solution comprising polyacrylonitrile (PAN) polymer, wherein polymerization is affected by controlled/living radical polymerization, in which the thiocarbonylthio compound functions as a Reversible Addition/Fragmentation Chain Transfer (RAFT) agent, wherein the thiocarbonylthio compound is selected from the following structures:

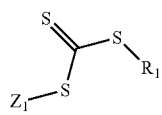
(I)

where $Z_1$ is selected from:

—CH$_2$—(CH$_2$)$_{10}$—CH$_3$; —(CH$_2$)$_n$—CH$_3$, n=0-20;

—C(CH$_3$)$_m$—COOH, m=1-2; —C(CH$_3$)$_m$—COOCH$_3$, m=1-2;

—C(CH$_3$)$_m$—COOC$_2$H$_5$, m=1-2;

$R_1$ is selected from:

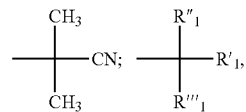

$R'_1$ is selected from: —CN;

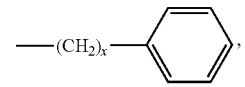

x=0-1;
$R''_1$ is selected from: H; —CH$_3$; —(CH$_2$)$_m$—COOH, m=1-2;
$R'''_1$ is H or —CH$_3$

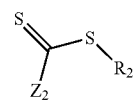
(II)

where $Z_2$ is selected from:

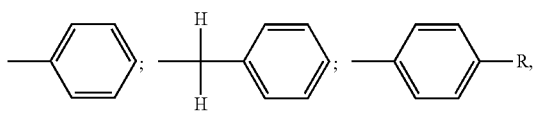

R is selected from: F, Cl, CN, OCH$_3$;
$R_2$ is selected from:

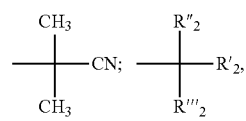

$R'_2$ is selected from: —CN;

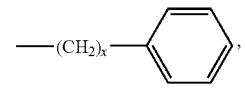

x=0-1;
—C(CH$_3$)$_m$—COOCH$_3$, m=1-2;
—C(CH$_3$)$_m$—COOC$_2$H$_5$, m=1-2;
$R''_2$ is selected from: H; —CH$_3$; —(CH$_2$)$_m$—COOH, m=1-2;
$R'''_2$ is H or —CH$_3$

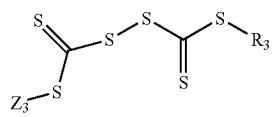
(III)

where $Z_3$ is selected from: $-CH_2-(CH_2)_{10}-CH_3$; $-(CH_2)_y-CH_3$, y=1-20;

$R_3$ is selected from: $-CH_2-(CH_2)_{10}-CH_3$; $-(CH_2)_y-CH_3$, y=1-20, wherein the PAN polymer has a polydispersity index (PDI) of about 2 or less and a molecular weight within the range of 60 kg/mole to 500 kg/mole;

d) spinning the polymer solution by wet spinning or air-gap spinning to form a PAN fiber precursor;

e) oxidizing the PAN fiber precursor; and f) carbonizing the oxidized fiber precursor.

2. The method of claim 1, wherein the PAN polymer has a molecular weight within the range of 115 kg/mole to 180 kg/mole.

3. The method according to claim 1, wherein the PAN polymer has a PDI (Mw/Mn) of 1.2 to 1.9.

4. The method according to claim 1, wherein the solvent is selected from the group consisting of: dimethyl sulfoxide (DMSO), dimethyl formamide (DMF), and dimethyl acetamide (DMAc), a mixture of zinc chloride ($ZnCl_2$) and water, and a mixture of sodium thiocyanate (NaSCN) and water.

5. The method according to claim 1, wherein the at least one co-monomer is selected from the group consisting of: vinyl-based acids, vinyl-based esters, and vinyl derivatives.

6. The method of claim 5, wherein the at least one co-monomer is selected from the group consisting of: methacrylic acid (MAA), acrylic acid (AA), itaconic acid (ITA), methacrylate (MA), methyl methacrylate (MMA), vinyl acetate (VA), ethyl acrylate (EA), butyl acrylate (BA), ethyl methacrylate (EMA), vinyl imidazole (VIM), acrylamide (AAm), diacetone acrylamide (DAAm).

7. The method according to claim 1, wherein the initiator is an azo compound or an organic peroxide.

8. The method according to claim 7, wherein the initiator is selected from the group consisting of: azobisisobutyronitrile (AIBN), azobiscyanovaleric acid (ACVA), 2,2'-azobis(2,4-Dimethyl) valeronitrile (ABVN), dilauroyl peroxide (LPO), ditertbutul peroxide (TBPO), diisopropyl peroxydicarbonate (IPP).

9. The method according to claim 1, wherein the thiocarbonylthio compound is selected from:

a) 2-cyano-2-propyl dodecyl trithiocarbonate (CPDTC)

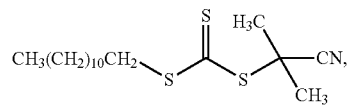

and b) bis-dodecylsufanylthiocarbonyl disulfide (BDSTD)

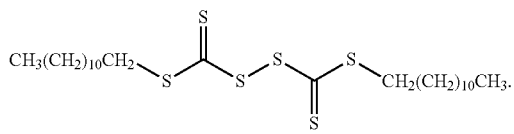

10. The method of claim 1, wherein the polymer solution of PAN polymer for spinning has a polymer concentration within the range of 5%-28% by weight based on the total weight of the solution.

11. The method of claim 1, wherein oxidizing is carried out within the temperature range of 200° C.-300° C.

12. The method of claim 1, wherein carbonizing includes pre-carbonization in an inert gas at a lower first temperature within the range of 300° C.-900° C., followed by carbonization at a higher second temperature within the temperature range of 700° C.-1650° C., said second temperature being higher than the first temperature.

* * * * *